Nov. 23, 1954  D. C. DE WITT ET AL  2,695,209
CAN UNPACKER
Filed Dec. 23, 1950  4 Sheets-Sheet 4
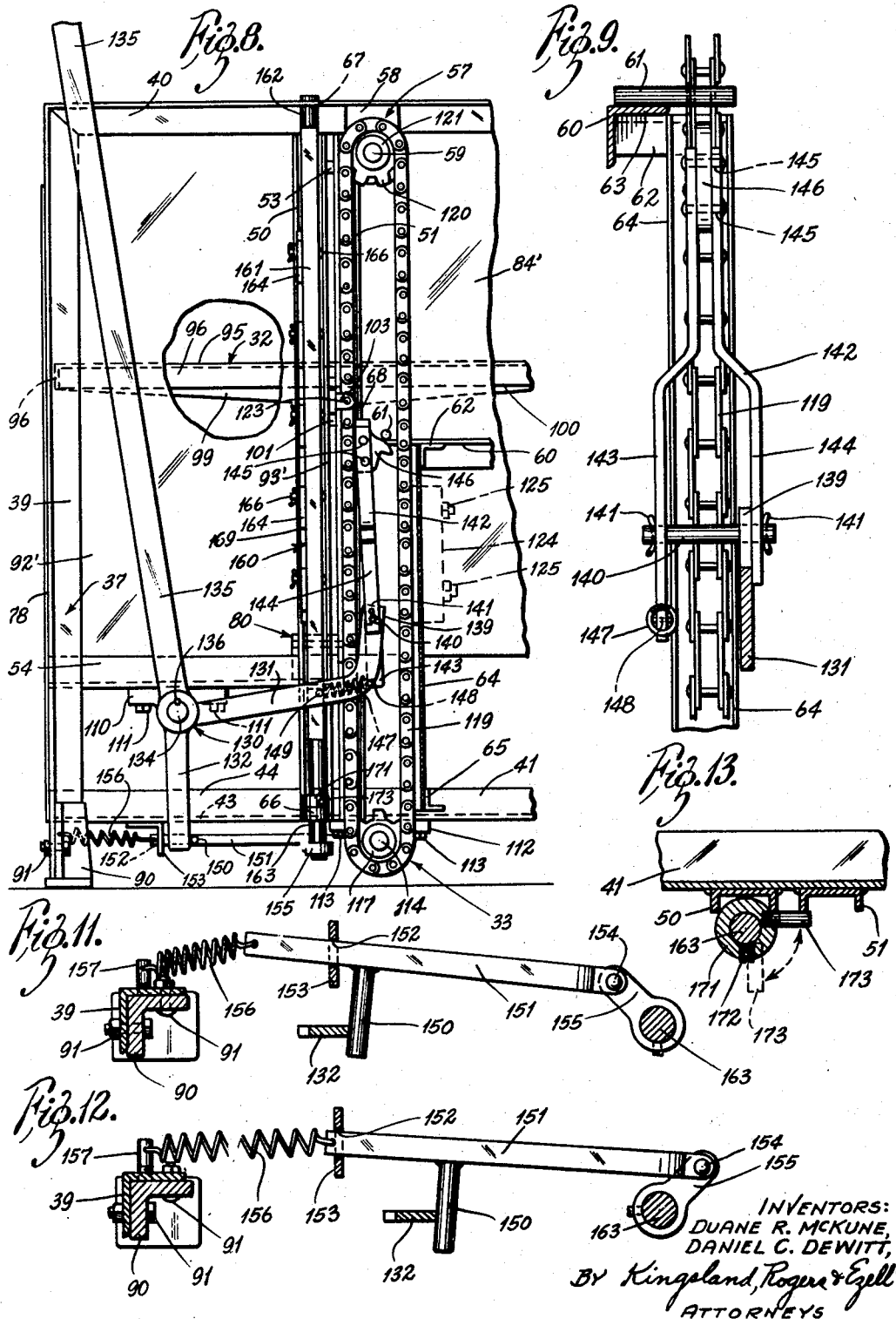
INVENTORS:
DUANE R. MCKUNE,
DANIEL C. DEWITT,
BY Kingsland, Rogers & Ezell
ATTORNEYS

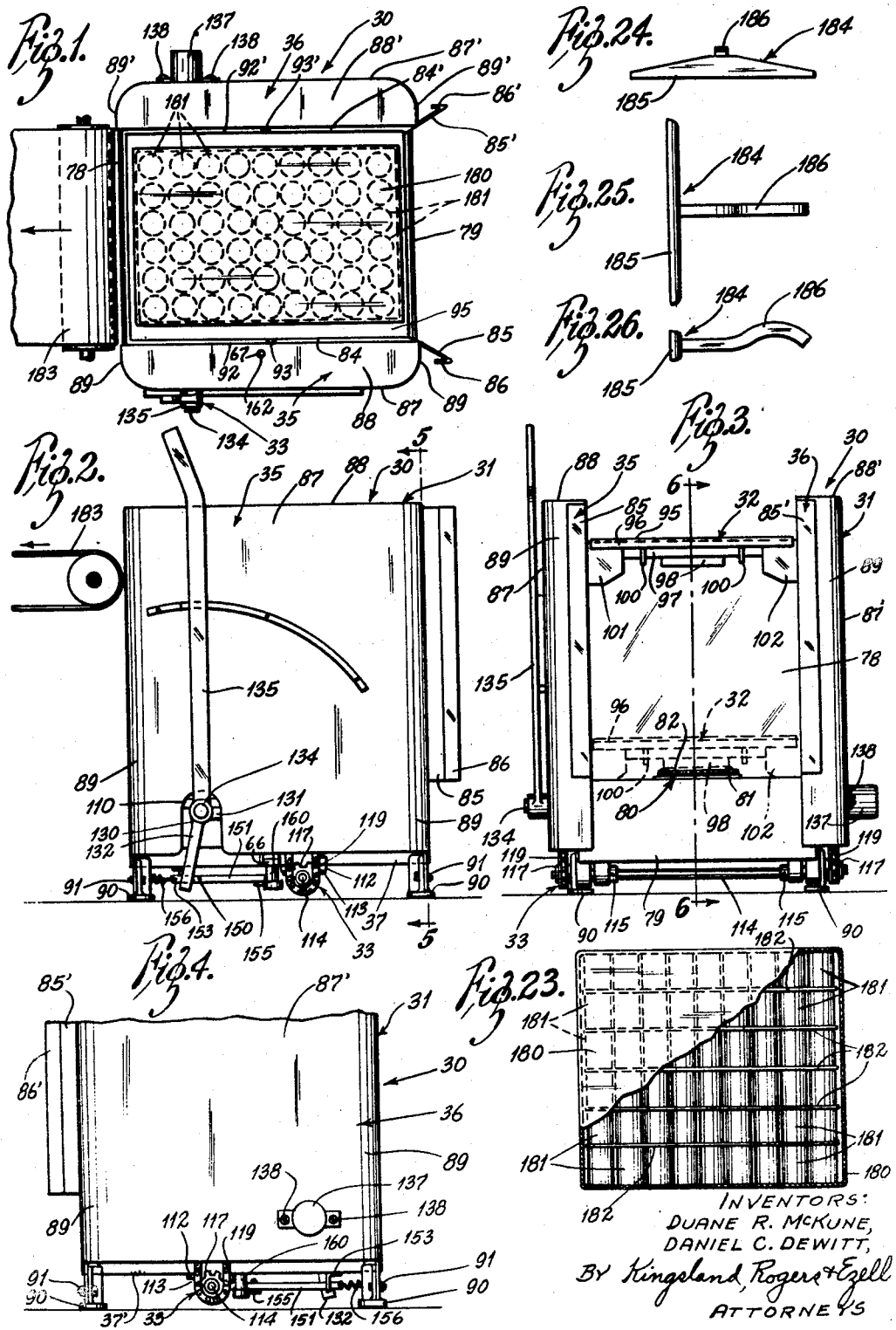

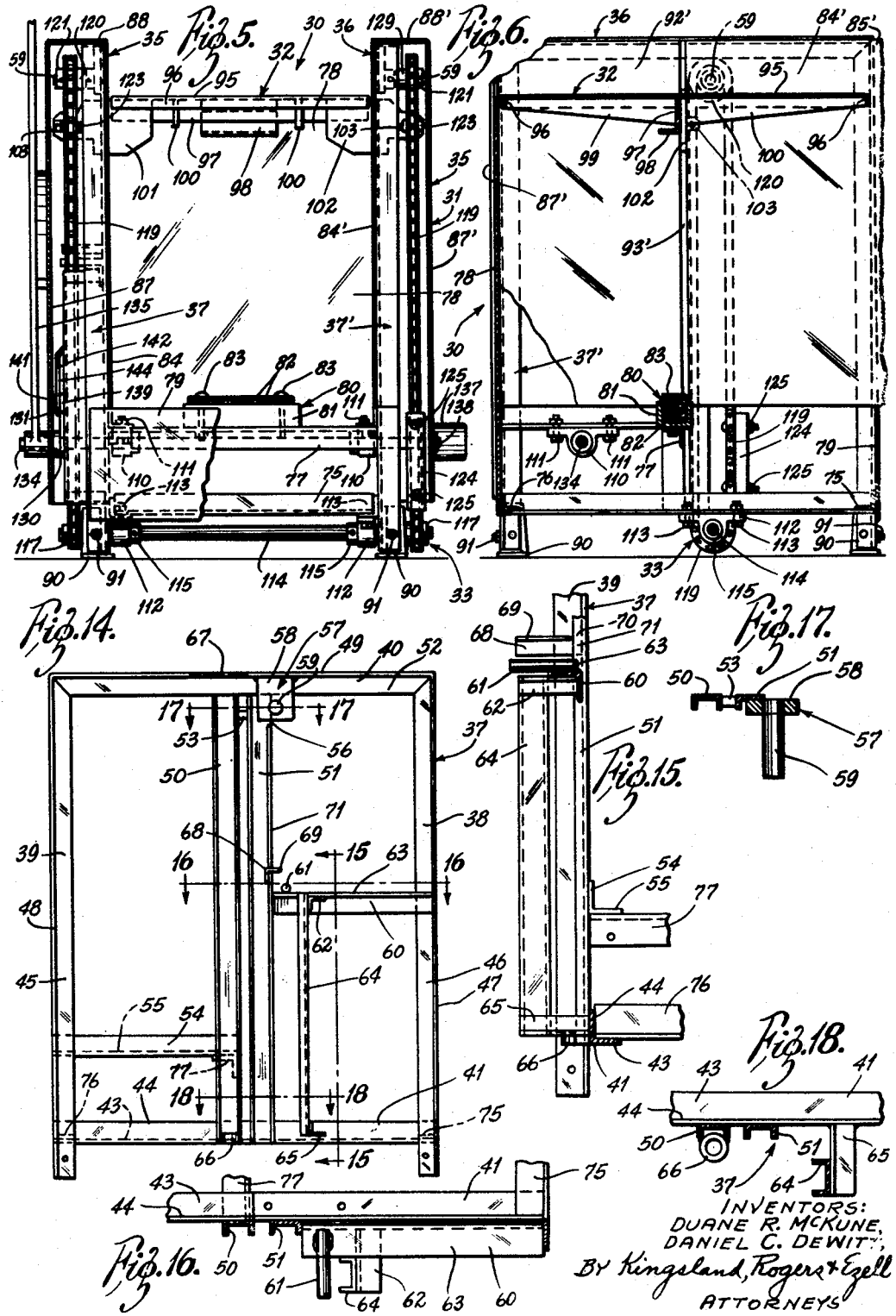

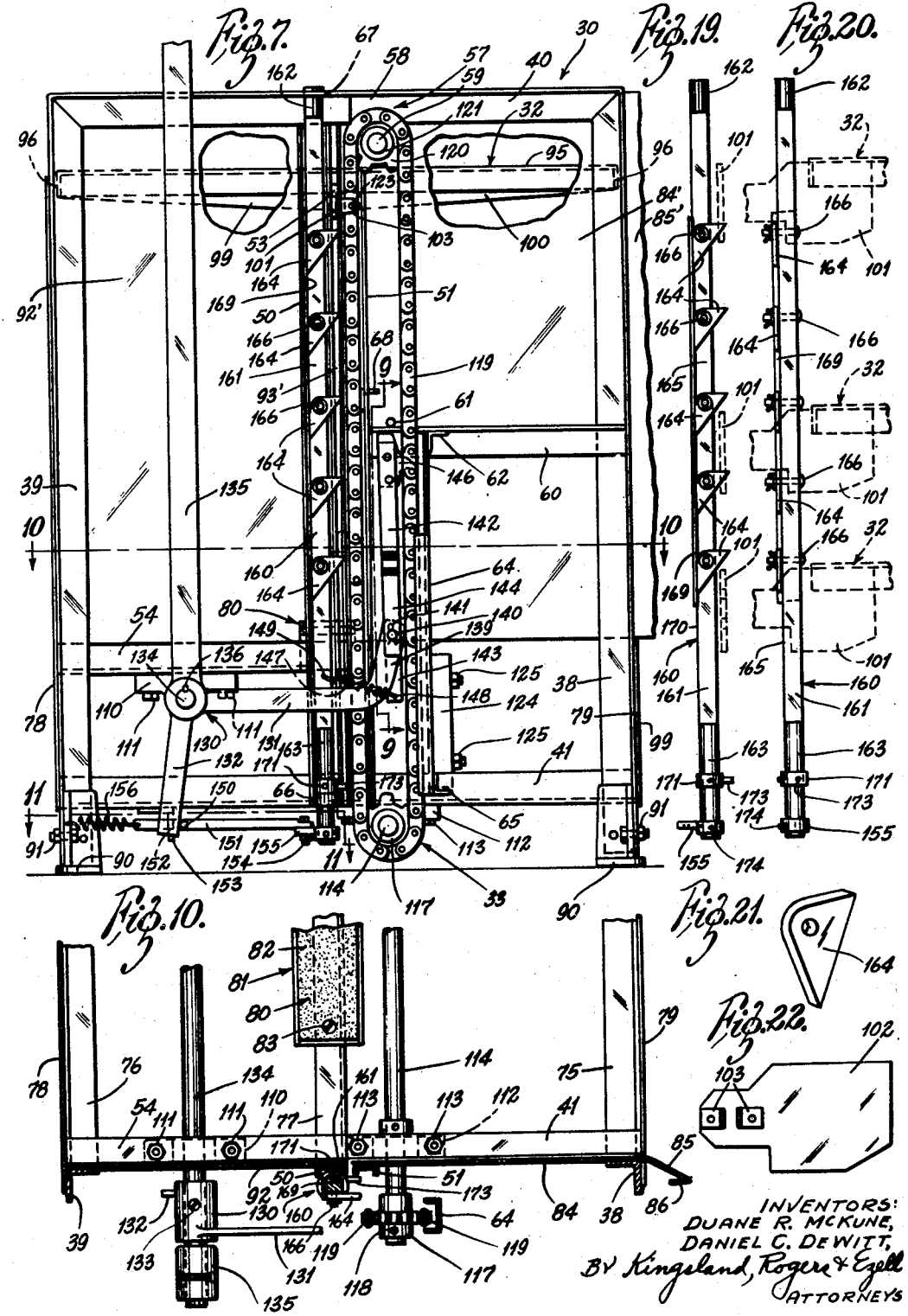

United States Patent Office 2,695,209
Patented Nov. 23, 1954

2,695,209

CAN UNPACKER

Daniel C. De Witt and Duane R. McKune, Dunedin, Fla., assignors to Clinton Foods Inc., New York, N. Y., a corporation of Delaware Application December 23, 1950, Serial No. 202,491

13 Claims. (Cl. 312—71)

The present invention relates to an unpacker, and more particularly to a can unpacker.

Briefly, the invention contemplates a novel device comprising a cabinet, a movable table therein, and means for raising and lowering the table for the purpose of permitting successive layers of stacked cans to be pushed off the next lower layer of cans and onto another surface, such as the belt of a can feeder or any other table or tray.

Empty cans to be filled with food products are normally received from the can manufacturer in paper bags or containers with the cans stacked in layers, the layers being separated one from another by flat sheets of paper. The cans thus received must be fed onto a surface from which they can be led via an unscrambling device to a filling machine. The present invention finds useful application, therefore, in canning factories where it is necessary to unpack and set out large numbers of cans so received.

It is an object of the present invention to provide a device which can receive a container of stacked cans and which can through simple manual manipulations of an operator position successive layers of the cans so as to permit their being pushed off onto a single plane surface.

It is another object of the invention to provide adjustable means by which successive elevations of a movable table are established automatically without the exercise of undue care by the operator.

It is another object of the invention to provide a movable table capable of being raised to successively higher elevations and thereafter lowered quickly to the low limit of its travel.

It is another object of the invention to provide a pushing device which can be used in cooperation with a movable table to transfer a layer of cans to an adjacent plane surface.

Other objects and advantages will become apparent from the following detailed description of a preferred embodiment of the present invention including the operation thereof.

In the drawings:

Fig. 1 is a top plan view of a can unpacker formed in accordance with the teachings of the present invention containing a package of stacked cans and located adjacent to a moving belt shown fragmentarily;

Fig. 2 is a side elevation of the unpacker located adjacent to the moving belt shown fragmentarily;

Fig. 3 is a front elevation of the unpacker with the movable table in its most elevated position and showing, in phantom, the movable table in its least elevated position;

Fig. 4 is a fragmentary side elevation of the unpacker showing the side opposite that of Fig. 2;

Fig. 5 is a vertical sectional elevation taken generally along the line 5—5 of Fig. 2 with a portion of the front guide plate broken away;

Fig. 6 is a fragmentary side sectional elevation taken generally along the line 6—6 of Fig. 3 with a portion of the side inner liner broken away;

Fig. 7 is a side elevation of the unpacker with outer casing removed and with portions of the inner linings broken away and showing the lifting mechanism in normal inoperative position;

Fig. 8 is an enlarged fragmentary side elevation of the unpacker with outer casing removed and with a portion of the inner lining broken away and showing the operating mechanism in position to cause the table to be lowered;

Fig. 9 is a further enlarged fragmentary sectional elevational taken generally along the line 9—9 of Fig. 7, and showing a portion of the lifting mechanism;

Fig. 10 is a fragmentary sectional plan view taken generally along the line 10—10 of Fig. 7 with some details omitted and others broken away for clarity;

Fig. 11 is an enlarged detailed view of the stop bar rotating mechanism in position to permit the table to be stopped at successive elevations;

Fig. 12 is a view of the mechanism of Fig. 11 in position to permit lowering of the table;

Fig. 13 is an enlarged detailed view of the stop bar positioning pin shown in the position occupied when the stop bar is rotated so as to permit successive elevation of the table and showing in phantom the position occupied when the stop bar is rotated so as to permit lowering of the table;

Fig. 14 is a side elevation, partially in section, showing the structural members of a side panel of the unpacker;

Fig. 15 is an enlarged fragmentary sectional elevation taken generally along the line 15—15 of Fig. 14;

Fig. 16 is an enlarged fragmentary sectional plan taken generally along the line 16—16 of Fig. 14;

Fig. 17 is an enlarged sectional plan taken generally along the line 17—17 of Fig. 14;

Fig. 18 is an enlarged fragmentary sectional plan taken generally along the line 18—18 of Fig. 14;

Fig. 19 is a side elevation of a stop bar assembly, showing in phantom three different positions of the movable table;

Fig. 20 is a front vertical elevation of a stop bar assembly, showing in phantom three different positions of the movable table;

Fig. 21 is an isometric view of a stop dog;

Fig. 22 is a side elevation of a table guide plate assembly;

Fig. 23 is a side elevation of a package of stacked cans with a portion of the side of the package broken away;

Fig. 24 is a front elevation of a pusher;

Fig. 25 is a top plan view of the pusher; and

Fig. 26 is a side elevation of the pusher.

Referring to the drawings more particularly by the numerals thereon, 30 indicates a can unpacker constructed in accordance with the teachings of the present invention. Broadly, the can unpacker 30 includes a containing and supporting cabinet 31, a movable table 32 therein, and a mechanism 33 for raising and lowering the table 32.

The cabinet 31 includes two opposed composite side panels 35 and 36. The side panel 35 includes a welded structural frame 37 as shown in Fig. 14. The frame 37 has a front vertical member 38, a rear vertical member 39, and a top horizontal member 40, these three members being fabricated from a single length of angle iron as shown in Fig. 14. A lower horizontal member 41 is attached to the lower ends of the vertical members 38 and 39, thus forming a rectangular frame. The lower member 41 has a horizontal flange 43 and a vertical flange 44, the latter flange 44 being disposed against a flange 45 of the rear vertical member 39 and a flange 46 of the front vertical member 38 so that the horizontal flange 43 extends in a direction opposite to that of transversely extending flanges 47, 48 and 49 of the members 38, 39 and 40, respectively. A channel 50 and a channel 51 are attached at their respective lower ends to the vertical flange 44 of the horizontal member 41 and extend upwardly from the lower edge thereof to abut the lower edge of a flange 52 of the horizontal member 40. A stop pin 53 is welded between adjacent flanges of the channels 50 and 51. A portion of one flange of the channel 51 is cut away as at 56 to accommodate a shaft bracket assembly 57, said bracket assembly 57 including a plate 58 welded to the inside of the angle of the top member 40 and depending therefrom, to which plate 58 is attached a transversely extending stub shaft 59 as shown in Fig. 17. A horizontal angle iron member 54 is attached to the flange 45 of the rear vertical member 39 and to the rear side of the web of the channel 50 so that a transversely extending flange 55 of the member 54 extends in a direction away from the member 39 and the channel 50.

The elements 38–55 above described as being included in the welded frame 37 of the side panel 35 are also included as described, but opposite in hand to form a second welded frame 37' which is a part of the side panel 36. The frame 37, however, has additional elements included therein for supporting various elements of the mechanism 33, as will be described.

A stop bar bearing 66 is welded between the flanges of the channel 50 so as to be in axial alignment with a stop bar hole 67 in the flange 49 of the member 40. An angle iron member 60 is framed into the angle of the vertical member 38 and extends horizontally therefrom to abut the near flange of the channel 51 as shown in Fig. 16. A deflecting pin 61 and an angle bracket 62 are disposed on the upper and lower sides, respectively, of a horizontal flange 63 of the member 60 and extend from the member 60 in the same direction as the horizontal flange 63 thereof as shown in Fig. 16. A vertical channel 64 extends between the angle bracket 62 and an angle bracket 65 attached to and extending transversely from the flange 44 of the member 41. An angle iron stop bracket 68 having a horizontally extending flange 69 partially cut away as at 70 in Fig. 15 is attached to the inside of a flange 71 of the channel 50 so as to extend from the channel 50 in the same direction as the flanges thereof.

The two structural frames 37 and 37', one being opposite in hand to the other, are disposed parallel one to the other, this relationship being maintained by front and rear cross members 75 and 76 attached, as by bolting or welding, to the lower horizontal members 41, by an intermediate cross member 77 attached to the members 54, by a rear cover plate 78 attached to the flanges 48 of the rear vertical members 39, and by a front guard plate 79 attached to the flanges 47 of the front vertical members 38. A bumper assembly 80 including a channel 81 and a plurality of resilient pads 82 disposed therein is mounted by means of bolt and nut assemblies 83 on the top of the horizontally disposed flange of the cross member 77 approximately midway between the frames 37 and 37' as shown in Figs. 5 and 6. The structural frames 37 and 37' are respectively enclosed by front inner liners 84 and 84' having vertical aprons 85 and 85' with turned back flanges 86 and 86', rear inner liners 92 and 92' spaced from the front inner liners 84 and 84' so as to leave slots 93 and 93' between the adjacent edges of the liners, said slots coinciding with the open spaces between the channels 50 and 51, and outer casings 87 and 87' having top flanges 88 and 88' and front and rear flanges 89 and 89'. The cabinet 31 stands on four feet 90 adjustably attached by means of bolt and nut assemblies 91 to the lower ends of the vertical members 38 and 39.

The movable table 32 is horizontally disposed within the cabinet 31 and includes a table top 95 having downturned flanges 96, a transverse gusset 97 having a bumper bracket 98 attached thereto, longitudinal gussets 99 and 100, and guide plates 101 and 102, all in welded assembly (Figs. 3 and 5–8). The guide plates 101 and 102 extend laterally through the slots 93 and 93' and between the channels 50 and 51 of frames 37 and 37', thus preventing the table 32 from tilting either frontward or rearward. A pair of angle brackets 103 bolted to each guide plate 101 and 102 provide for attachment of the table 32 to the mechanism 33 as will appear.

The mechanism 33 includes two shaft bearing assemblies 110 which are secured by bolt and nut assemblies 111 to the under side of the flanges 55 of the members 54 so as to depend therefrom and be in axial alignment one to the other (Figs. 2 and 5–8). Additionally, two shaft bearing assemblies 112 are secured as by bolt and nut assemblies 113 to the under side of the flanges 43 of the lower horizontal members 41 so as to depend therefrom and be in axial alignment one to the other.

A shaft 114 is rotatably mounted in the bearing assemblies 112, being restrained from axial movement by collars 115 secured to the shaft 114 by setscrews. Lower sprockets 117 secured to the respective ends of the shaft 114 by setscrews are engaged by chains 119, the latter also engaging upper sprockets 120 rotatably mounted on the stub shafts 59 and restrained from axial movement by collars 121 secured by set-screws.

A special chain pin 123 extends from each chain 119 to engage each pair of the angle brackets 103, and thus provide an attachment between the movable table 32 and the mechanism 33 such that movement of the latter, including vertical movement of the chains 119, will cause the table to move in corresponding vertical movement. The table 32 is limited in its upward travel by abutment of the guide plates 101 and 102 against the stop pins 53 and in its downward travel by cushioned abutment of the bumper bracket 98 against the bumper assembly 80. A counterweight 124 weighing somewhat less than the table 32 is attached to the run of one of the chains 119 opposite the run containing the special pin 123 by bolt and nut assemblies 125 (Fig. 7).

The mechanism 33 also includes a bell crank 130 having laterally offset arms 131 and 132, said bell crank 130 being secured by a setscrew 133 to a shaft 134 rotatably mounted in the bearing assemblies 110 and extending laterally beyond the outer casings 87 and 87'. An operating lever 135 may be mounted interchangeably on either end of the shaft 134 and secured against rotation thereon as by a key 136, the opposite projecting end of the shaft 134 being enclosed by a cover 137 attached to the appropriate outer casing such as 87' by screws 138. The arm 131 of the bell crank 130 extends forwardly and has an upturned end 139 to which is pivotally attached, by means of a pin 140 retained by cotter pins 141, a drag link assembly 142. The drag link assembly 142 includes two parallel links 143 and 144 through which the pin 140 extends and between the upper inset ends of which is riveted, as by rivets 145, a hook 146, as shown in Figs. 8 and 9. The hook 146 serves to engage various pins of the chain 119 so as to effect downward movement of the forward run thereof and is continuously urged toward engagement with the chain 119 by the action of a tension spring 147 having its free end hooked into a hole 148 in the lower end of the link 143 and having its fixed end hooked into a hole 149 in the forwardly disposed flange of the channel 50 of the frame 37.

The arm 132 of the bell crank 130 extends downwardly to bear against a pin 150 welded to and projecting laterally from a link 151 which is slidably supported at one end by a slot 152 in an angle bracket 153 attached so as to depend from the flange 43 of the lower horizontal member 41 of the frame 37 (Figs. 7, 8, 11 and 12). The other end of the link 151 is pivotally attached by means of a bolt and nut assembly 154 to a crank arm 155. A tension spring 156 acting between a pin 157 in threaded attachment with the rear vertical member 39 of the frame 37 and the link 151 causes the pin 150 to be continuously urged toward the arm 132 until its travel in such direction is otherwise restrained as will appear.

A stop bar assemby 160 includes a stop bar 161 having the greater portion of its length square in section, but having an upper portion 162 and a lower portion 163 which are round in section (Figs. 7, 8, 19 and 20). A plurality of triangular stop dogs 164 are pivotally mounted in spaced relation on a face 165 of the square portion of the stop bar 161 by means of headed pins 166 retained by suitable washers and cotter pins. A stop strip 169 is attached, as by welding, to a face 170 of the stop bar 161, said face 170 being adjacent to the face 165. The stop strip 169 extends laterally beyond the face 165 so as to limit the downward rotation of the stop dogs 164, as shown in Fig. 19. The stop bar assembly 160 is rotatably mounted in the structural frame 37 by means of the stop bar hole 67 and the stop bar bearing 66 and is held in appropriate vertical adjustment by means of a stop bar collar 171 adjustably secured by means of a setscrew to the lower portion 163 of the stop bar 161 so as to rest slidably on the upper face of the stop bar bearing 54. The stop bar collar 171 also has threaded thereto a projecting pin 173, the side of which abuts adjacent flanges of the channels 50 and 51 of the frame 37 as shown in Fig. 13 when the stop bar assembly 160 is so rotated as to dispose the stop dogs 164 in a forwardly projecting position. The crank arm 155 is also secured by a setscrew to the lower portion 163 of the stop bar 161 and thus serves to translate the reciprocating motion of the link 151 into rotative motion of the stop bar assembly 160. It will be noted that abutment of the pin 173 against the adjacent flanges of the channels 50 and 51 acts through the stop bar 161 and the crank arm 155 to limit the rearward movement of the link 151.

*Operation*

In operating the can unpacker 30, a paper package 180 containing cans 181 stacked in horizontal layers separated by paper sheets 182 is placed upon the table 32 which is initially in its least elevated position as determined by abutment of the bumper bracket 98 against the bumper assembly 80. This disposes the uppermost layer of the cans 181 at an appropriate elevation with respect to an adjacent plane surface such as the upper face of a belt assembly 183, shown in Figs. 1 and 2, to permit this layer of cans to be pushed onto the adjacent plane surface as by means of a pusher 184 having a push bar 185 and a handle 186, as shown in Figs. 24, 25 and 26.

The removal of the front, rear and top sides of the paper package 180 by the operator of the can unpacker permits the operator to push off the top layer of cans, after which a forward pull of the operating lever 135 will raise the table 32 so that the guide plate 101 will pass the lower stop dog 164, causing it to rotate upward, from which upward position it will revert by gravity to its original position of abutment against the stop strip 169. Upon release of the operating lever 135, the table 32 will descend by gravity until the guide plate 101 rests on the stop dog 164, thus supporting the table 32 at an appropriate elevation to permit the pushing off of the second layer of the cans 181. In like manner, subsequent successive pulling and releasing of the operating lever 135 will cause the table 32 to be positioned at successively higher elevations corresponding to the spaced relation of the stop dogs 164 so that each layer of the cans 181 may be pushed off.

The forward movement of the operating lever 135 acts through the shaft 134 and the arm 131 of the bell crank 130 to pull the drag link assembly 142 in a downward direction. The hook 146, being urged into engagement with the chain 119 as aforementioned, the forward runs of both chains 119 are pulled downward causing the rearward runs to which the table 32 is attached to move upward, thus raising the table 32 above the next higher stop dog 164. When the operating lever 135 is released by the operator, it is caused to return to its original position, as determined by abutment of the arm 132 of the bell crank 130 against the pin 150, by action of the spring 147. This causes the hook 146 to slide upward along the chain 119 for subsequent reengagement therewith at a higher point thereon. The forward run of the chain 119 is maintained in vertical alignment against the horizontal pressure of the drag link assembly 142 by the vertical channel 64.

When the table 32 has been raised to a position permitting the bottom layer of the cans 181 to be pushed off, a rearward push of the operating lever 135 will cause the table 32 to drop quickly to its original position of least elevation preparatory to unpacking another package of cans. The rearward movement of the lever 135 acts through the shaft 134, the arm 132 of the bell crank 130, the pin 150, the link 151 and the crank arm 155 to rotate the stop bar assembly through a horizontal angle of approximately 90°, thus swinging all of the stop dogs 164 out of the plane of the guide plate 101. At the same time, the rearward movement of the lever 135 causes the hook 146 to move upward along the chains 119 until an appropriately shaped upper edge of the hook 146 abuts the deflecting pin 61, whereupon continued upward movement of the hook 146 causes it to be deflected away from the forward run of the chain 119, thus preventing engagement therewith (Fig. 8). The upward movement of the hook 146 is limited by abutment of the upper ends of the links 143 and 144 against the stop bracket 68.

With the stop dogs 164 swung out of position to support the guide plate 101 and with the hook 146 disengaged from the chain 119, the table 32 is free to fall by gravity to its lowest position, being slowed, however, in its rate of descent by the counterweight 124. Upon release of the lever 135, the spring 156 acts to restore all elements of the mechanism 33 to their original positions.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In a can unpacker, a table, means to support the table at a plurality of predetermined vertical elevations, said means including a pivoted element for each of said predetermined vertical elevations except the lowest thereof, means secured to the table and adapted to engage one of said pivoted elements so as to be supported thereby, means to raise the table from a lower to a higher of said predetermined vertical elevations; and means to free said means secured to the table from possible engagement with any of said pivoted elements, whereby to provide for direct return of the table to the lowest of said predetermined elevations.

2. In a can unpacker, a table, rotatable means to support the table at a plurality of predetermined vertical elevations, mechanical means to raise the table from one to another of said predetermined vertical elevations, said mechanical means including a movable member having a plurality of identical elements, said member being connected to the table, said mechanical means including also pivoted means engageable with said movable member whereby to effect an increased elevation of the table, and means whereby said rotatable means may be rotated so as to render it incapable of supporting the table.

3. In a can unpacker, a table, rotatable means to support the table at a plurality of predetermined vertical elevations, a chain connected to the table, hook means engageable with the chain whereby to effect an increased elevation of the table, and an operating lever, said lever having a neutral position and being adapted to cooperate with said hook means and said chain to effect an increased elevation of the table when moved in one direction from neutral and being adapted to cooperate with said rotatable means to effect a decreased elevation of the table when moved in the other direction from neutral.

4. In a can unpacker, a cabinet having an open front and top, a table disposed in said cabinet so as to be vertically movable therein, means supported in said cabinet defining predetermined elevations at which the table may be selectively disposed, said means being restrained against vertical movement, a lever mounted for pivotal movement on the cabinet, said lever having a neutral position and being adapted to move in either of two directions therefrom, means whereby a single movement of said lever in one direction is effective to raise said table from one of a plurality of predetermined elevations to a higher of said plurality of predetermined elevations, and means whereby a single movement of said lever in the other direction is effective to provide for the return of said table from any except the lowest of said plurality of predetermined elevations directly to the lowest thereof.

5. In a can unpacker, a supporting structure, a table mounted in said structure for vertical movement, upper and lower sprockets mounted in said structure, an endless chain passing around said upper and lower sprockets thereby to provide a forward vertical run and a rear vertical run, said table being connected to the rear vertical run, a counterweight connected to the forward vertical run, a drag link assembly including a hook engageable with the forward run, said hook being adapted to move said forward run downwardly, but not upwardly, biasing means whereby said hook is biased toward engagement with said forward run, means including a lever to move said drag link assembly downwardly, thereby to effect an increased elevation of said table, a rotatable stop bar assembly mounted in said structure having a plurality of pivotally mounted stop dogs, each adapted to support said table at a different predetermined elevation thereof, a linkage connected to said stop bar assembly including biasing means whereby said stop bar is biased toward a position wherein said stop dogs may support said table, means coacting with said lever and engageable with said linkage whereby said stop bar may be rotated so as to render said stop dogs incapable of supporting said table, thereby to provide for the return of said table to a lowest predetermined elevation thereof, and means adapted to withhold said hook from engagement with said forward run during said return of said table.

6. In a can unpacker, in combination, a supporting structure, a can receiving table mounted in said supporting structure for vertical up and down movement, a plurality of vertically spaced stop means mounted in said supporting structure selectively engageable by said table, each stop means permitting movement of said table upwardly and normally preventing movement thereof downwardly, each stop means defining a table position, means for moving said table upwardly, and means for simultaneously moving said several stop means out of table engaging position, said table being disposed in said supporting structure for gravity descent to lowest position upon moving of said stop means out of table engaging position.

7. The combination as set forth in claim 6 in which said means for moving said table upwardly includes a continuous chain mounted in said supporting structure and connected to said table, an operating member pivotally mounted in said structure, and releasable connecnections between said operating member and said chain.

8. The combination as set forth in claim 6 in which said means for moving said table upwardly includes a continuous chain mounted in said supporting structure and connected to said table, an operating member pivotally mounted in said structure, releasable connections between said operating member and said chain, and a counterbalance weight on said chain secured to the run opposite to that connected to said table to ease gravity drop of said table.

9. In a can unpacker, in combination, a supporting structure, a table mounted in said supporting structure for vertical up and down movement, said table being adapted to support tiers of cans, table position defining means comprising a vertically disposed shaft rotatably mounted in said supporting structure, vertically spaced stop elements pivotally mounted on said shaft, and means engaging each of said stop elements limiting pivotal movement thereof downwardly below table defining positions, but permitting upward pivotal movement to permit upward passage of said table, means for moving said table upwardly, and means for rotating said shaft to simultaneously move all of said stop elements out of table engaging position, said table being disposed in said supporting structure for gravity descent to lowest position upon moving of said stop elements out of table engaging position.

10. In a can unpacker, in combination, a supporting structure, a table mounted in said supporting structure for vertical up and down movement adapted to receive tiers of cans, a pair of vertical opposed endless chains supported by said structure for endless movement, means connecting said chains to opposite sides of said table including a guide plate forming part of each connecting means, a vertically disposed shaft rotatably mounted in said structure, a plurality of vertically spaced stop elements mounted on said shaft defining a plurality of table positions adapted to be engaged by one of said guide plates in vertical movement of said table, a horizontally disposed shaft rotatably mounted in said structure, an operating member connected to said horizontal shaft for rotation thereof, a bell crank secured to said horizontal shaft for rotation therewith, a hook member pivotally connected to one arm of said bell crank, and means biasing said hook member toward one of said chains for engagement therewith, said hook member being formed to slide over chain pins in movement in one direction and to actuate the chain to raise said table a predetermined vertical distance in movement in an opposite direction, whereby movement of said operating member in one direction from a neutral position a predetermined amount may effect raising of said table from one position to the next higher position.

11. The combination as set forth in claim 10 including connecting members between the other arm of said bell crank and said vertical rotatable shaft, said connecting members being arranged to rotate said vertical rotatable shaft to move said stop elements out of the vertical path of said guide plate upon movement of said operating member in the other direction from said neutral position to permit descent of said table.

12. The combination as set forth in claim 11 including a deflector stop member engageable by said hook member upon movement of said operating member in said other direction, said deflector stop member deflecting said hook member out of engagement with said chain upon engagement therewith and maintaining such hook member free from said chain, said table upon rotation of said vertical shaft and disengagement of said hook member being free to descend by gravity to a predetermined initial lowest position for reception of tiers of cans.

13. The combination as set forth in claim 10 in which said stop elements are pivotally connected to said supporting shaft and are freely movable to permit upward vertical passage of said guide plate, said pivotal movement of said stop elements being limited to dispose them in the path of said guide plate as positive stops to define said table positions.

References Cited in the file of this patent

UNITED STATES PATENTS

| Number | Name | Date |
|---|---|---|
| 470,116 | Finsterer | Mar. 1, 1892 |
| 533,410 | Blake | Jan. 29, 1895 |
| 627,095 | Bowlus | June 20, 1899 |
| 698,896 | Beierstore | Apr. 29, 1902 |
| 1,543,737 | Thornton | June 30, 1925 |
| 1,783,827 | Carr | Dec. 2, 1930 |
| 2,076,186 | Reynolds et al. | Apr. 6, 1937 |
| 2,280,810 | Eddy et al. | Apr. 28, 1942 |
| 2,307,194 | Benning | Jan. 5, 1943 |
| 2,338,048 | Minaker et al. | Dec. 28, 1943 |